US009674307B1

(12) United States Patent
Hasan et al.

(10) Patent No.: US 9,674,307 B1
(45) Date of Patent: *Jun. 6, 2017

(54) RUNNING MOBILE APPLICATIONS IN A DISTRIBUTED CLIENT-SERVER MODEL USING SELECTIVE DELEGATION OF HARDWARE AND SOFTWARE CONTEXTS TO THE CLIENT

(71) Applicant: Cloudzilla, Inc., Santa Clara, CA (US)

(72) Inventors: Raheel Hasan, Cupertino, CA (US); Badri Gopalan, Sunnyvale, CA (US); Melvin Cardozo, San Jose, CA (US); Sharjeel Hasan, Saratoga, CA (US)

(73) Assignee: Cloudzilla, Inc., Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/214,235

(22) Filed: Mar. 14, 2014

Related U.S. Application Data

(60) Provisional application No. 61/799,972, filed on Mar. 15, 2013, provisional application No. 61/798,536, filed on Mar. 15, 2013.

(51) Int. Cl.
*G06F 13/00* (2006.01)
*H04L 29/06* (2006.01)
*H04L 29/08* (2006.01)

(52) U.S. Cl.
CPC .......... *H04L 67/42* (2013.01); *H04L 67/1091* (2013.01); *H04L 67/34* (2013.01)

(58) Field of Classification Search
CPC .............. H04L 29/08072; H04L 29/06; H04L 29/0809; H04L 29/06047; H04L 67/34; H04L 67/42; H04L 67/1091; G06Q 30/02; H04W 8/245; H04W 24/02; H04W 88/02; H04W 8/265; H04M 1/72525; H04M 1/72522; H04M 2207/18; H04M 3/42178
USPC .................................. 455/218, 219; 709/203
See application file for complete search history.

(56) References Cited

U.S. PATENT DOCUMENTS

2013/0324099 A1* 12/2013 Dgani .................... C08L 97/02
455/418

* cited by examiner

*Primary Examiner* — Robert B Harrell
(74) *Attorney, Agent, or Firm* — Pillsbury Winthrop Shaw Pittman LLP

(57) ABSTRACT

The configuration describes the methods to transform the execution of an Android app running locally on an Android device to a client-server model of execution where the app executes on a modified version of Android on a server. Unlike a traditional client-server model where the application executes within the server environment, the Android app on the server requires delegation of some functionality to client environment. The proposed configuration also describes the methods for delegating the execution of selected components of Android stack to the Client Device. The client may be a browser or any web connected device.

26 Claims, 8 Drawing Sheets

RUNNING MOBILE APPLICATIONS IN A DISTRIBUTED CLIENT-SERVER MODEL USING SELECTIVE DELEGATION OF HARDWARE AND SOFTWARE CONTEXTS TO THE CLIENT

RELATED APPLICATIONS

This application claims the benefit of U.S. Provisional Patent Application Ser. Nos. 61/799,972 and 61/798,536 both filed Mar. 15, 2013, each of which are hereby incorporated by reference.

BACKGROUND

An Android™ based mobile device will typically have a wide variety of input sensors and interfaces such multi-touch, GPS, compass, accelerometer, gyroscope, multiple cameras, etc. They may also have barometer, thermometer, near field communication sensors, etc. Application for mobile devices are designed to rely, when needed, on these additional sensors and interfaces that are typically not available on a typical computer.

The server client mechanism is the primary way of connecting to a remote computer. An example of this is the Virtual Network Computing (VNC®) protocol, which transmits keyboard and mouse events from the user computer to the server computer, and relays screen and audio updates from the server computer to the user. The connection between the two computers is over a computer network. All execution of the application happens on the server using the server resources (hardware, software, operating system) and in the server context (time zone, server system state, etc.). The current movement towards cloud computing is extending this concept where applications, such as Microsoft Office®, that were typically designed to be used locally on a machine are now moving towards a client server model.

SUMMARY

A conventional Android based mobile device runs the entire Android stack locally on that device. The move from running everything locally to client server model needs to take into account an Android app's reliance on the client context for its behavior. The server running the app in this configuration will have to delegate certain Android functionality to the client wherever the app requests information that may be only available from the client. What gets delegated to the client will also depend on the native capabilities and resources available on the client.

The configuration provides the ability to experience an Android app on a local device (potentially running a different operating system) while running the app on the remote server. It also covers the key changes needed to the Android stack on the server and the additional component for the delegated functionality to the client. The modifications affect most layers in the original Android operating system stack but the app itself remains unchanged and can be directly run on the server.

In one embodiment is described a method of executing a plurality of user software applications written for an Android operating system so that a plurality of user devices each operating with either an Android or a non-Android operating system can replicate the user software application using inputs received from at least one of the plurality of user devices, the method comprising the steps of: providing at a server system that includes a plurality of servers, processors and memory, the plurality of user software applications, and a server version of the Android operating system that includes an Android kernel driver capable of receiving client context inputs, wherein the client context inputs include real data inputs available from each of the plurality of user devices and simulated data inputs required for each of the plurality of user devices and further based on a master data type set, the master data type set including keyboard data, touch data, location data, accelerometer data and a plurality of software elements, wherein the plurality of software elements relate to data provided by the at least one of the plurality of user devices and include at least certain ones of the real data inputs or the simulated data inputs; receiving, at the server system, a plurality of different requests to execute different ones of the plurality of user software applications, each different received request having a user device identifier associated therewith, such that each of the plurality of different user software applications is requested and which of the plurality of user devices made each different request is identified; receiving, at the server system, an identifier associated with each of the plurality of user devices; determining, at the server system, and based on the identifier, the client context inputs required for operation of each of the plurality of user software applications; executing each of the plurality of user software applications on the server system using the server version of the Android operating system based upon the plurality of different received requests, the step of executing including the steps of: requesting using the server system, from each of the plurality of user devices, a plurality of client context inputs necessary to complete execution of each of the plurality of user software applications, wherein the client context inputs requested include various ones of the client context inputs required for operation of the plurality of user software applications and further include a data set of the keyboard data, the touch data, the location data, and the accelerometer data, some of which are real data and others of which are simulated data on the server system using the server version of the Android operating system; receiving, at the server system and for processing by the Android kernel driver, the various client context inputs necessary to complete execution of the plurality of user software applications on the server system using the server version of the Android operating system; providing, at the server system, output data that includes display data and audio data, rendered for perception at the user device with respect to each of the plurality of different user software applications, appropriate for perception of the user software application at each of the plurality of user devices; and transmitting, from the server system, the output data for reception by the user device for each of the plurality of different user software applications, such that each of the user software applications is executed on one of the plurality of user devices.

In other aspects, a non-transitory computer readable storage medium and apparatus related to the above are described.

BRIEF DESCRIPTION OF DRAWINGS

The disclosed embodiments have other advantages and features which will be more readily apparent from the following detailed description and the appended claims, when taken in conjunction with the accompanying drawings in which:

DETAILED DESCRIPTION

The embodiment described herein is related to techniques for partitioning the Android system to correctly execute an unmodified Android App 105 in a client-server mode. The App 105 runs primarily on the server, but the components of the Android system which require client context are run in a synchronous manner with the Client Device 400 context. Some of these techniques may be used individually or in combination and can be extended to existing components of the Android system which are not described in this description, or may come into existence at a future time.

The embodiment describes the partitioning of the Android device into a server module—Android Server 299—which runs a modified version of the Android Operating System and a Client Delegate 401 application, which is built for a Client Device 400, running on the client operating system or environment and a means to connect the server with the client using a network. The Client Delegate 401 application may run natively on the Client Device 400 or on a browser platform on the Client Device 400. The Client Device 400 may run on Android or any another operating system. The Client Device 400 is not restricted to a particular computer architecture (such as x86 or ARM). The embodiment describes the types of modifications to be made to the Android operating system stack on the server. The embodiment also describes the functionality of the delegate application and few examples of synchronizing the server context with the client context.

Figure 1:
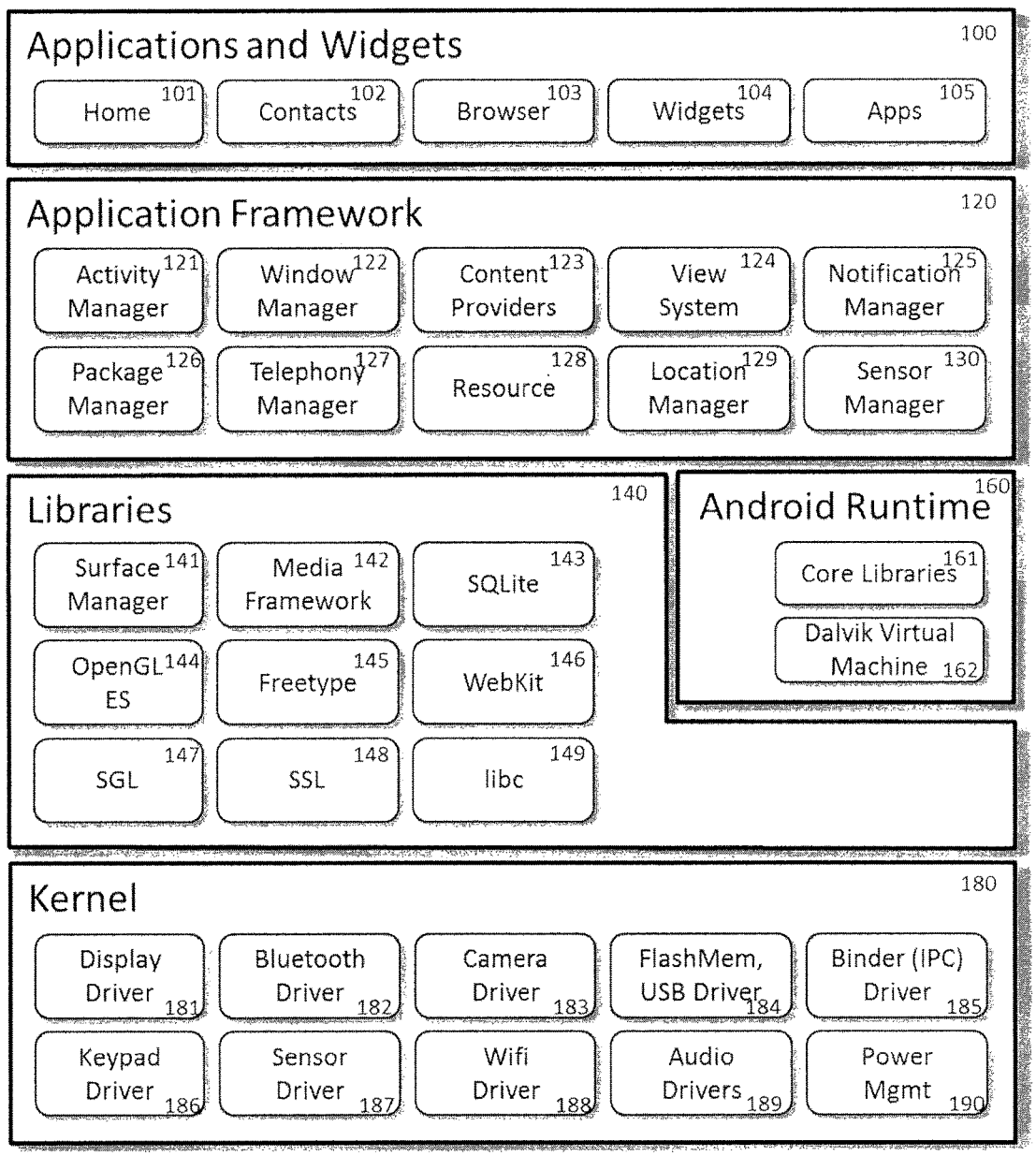
FIG. 1 illustrates the architecture of the original Android System according to one embodiment.

Application Execution on Android in the Original Device
As illustrated in FIG. 1, Android has the following layers
Applications 100 (usually written in Java but may also be written partly or wholly in C using the Android NDK—Native Development Kit). The Applications 100 may also invoke or interact with other applications as part of their execution flow.
Application Framework 120 services and libraries written mostly in Java A Dalvik Virtual Machine 162 provides the runtime execution environment for the java applications and framework code.
Native Libraries 140 and services written in C/C++
The Linux kernel 180. The key kernel drivers include the hardware drivers, file system access, networking and process handling and communication. The device manufacturers implement or customize the hardware drivers to give access to the hardware from the operating system.

Figure 8:
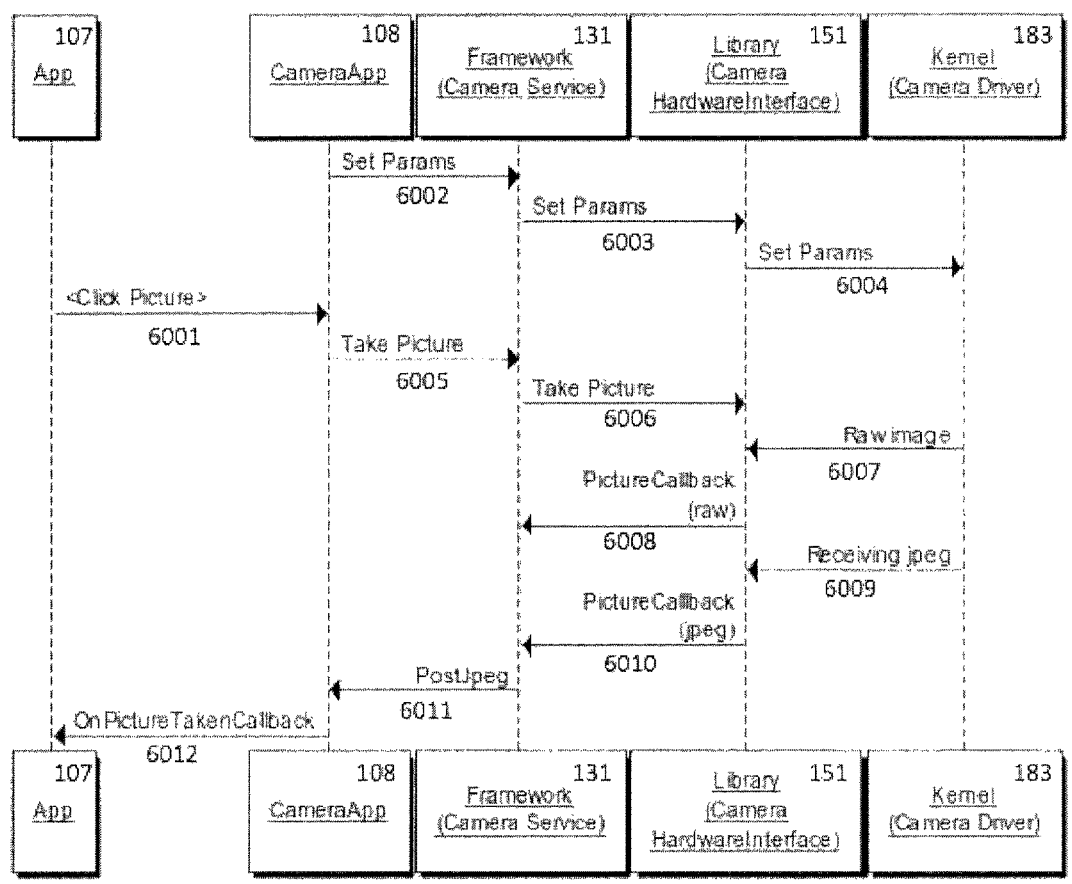
FIG. 8 illustrates a sequence diagram of an example of app initiated requests to access camera functionality on the original device according to one embodiment.

An App 105 which executes on Android:
requires inputs from various sensors and other input mechanisms supported on the mobile Device. A listing of some of the input mechanisms potentially accessible to the apps 105 via the Android Framework 120 is listed in Table 1. It is noted that many of the inputs provided by the mobile device are not like conventional inputs available on a traditional computer system.
renders outputs on the mobile device. These outputs include the screen, audio, vibration.
invokes services provided by other apps for auxiliary functionality including but not limited to inputs. An example is an App 105 which requires a photograph to be taken may request for a camera service, which is fulfilled by a system-provided Camera App 108. The system provided Camera App 108 now provides the functionality of interfacing with appropriate services in Android Framework 120 (/java/Android/media) going on lower in the Android stack to the Camera Driver 183 in the Linux Kernel 180 as illustrated in FIG. 8.
uses Android Libraries 140 for a range of functionality including but not limited to networking, time management, display management, 2D and 3D graphics, database services, media access services, web access and the Bionic C Libraries 249
may use other features not described above but provided by the components shown in the Android system architecture diagram as illustrated in FIG. 1.

Figure 2:
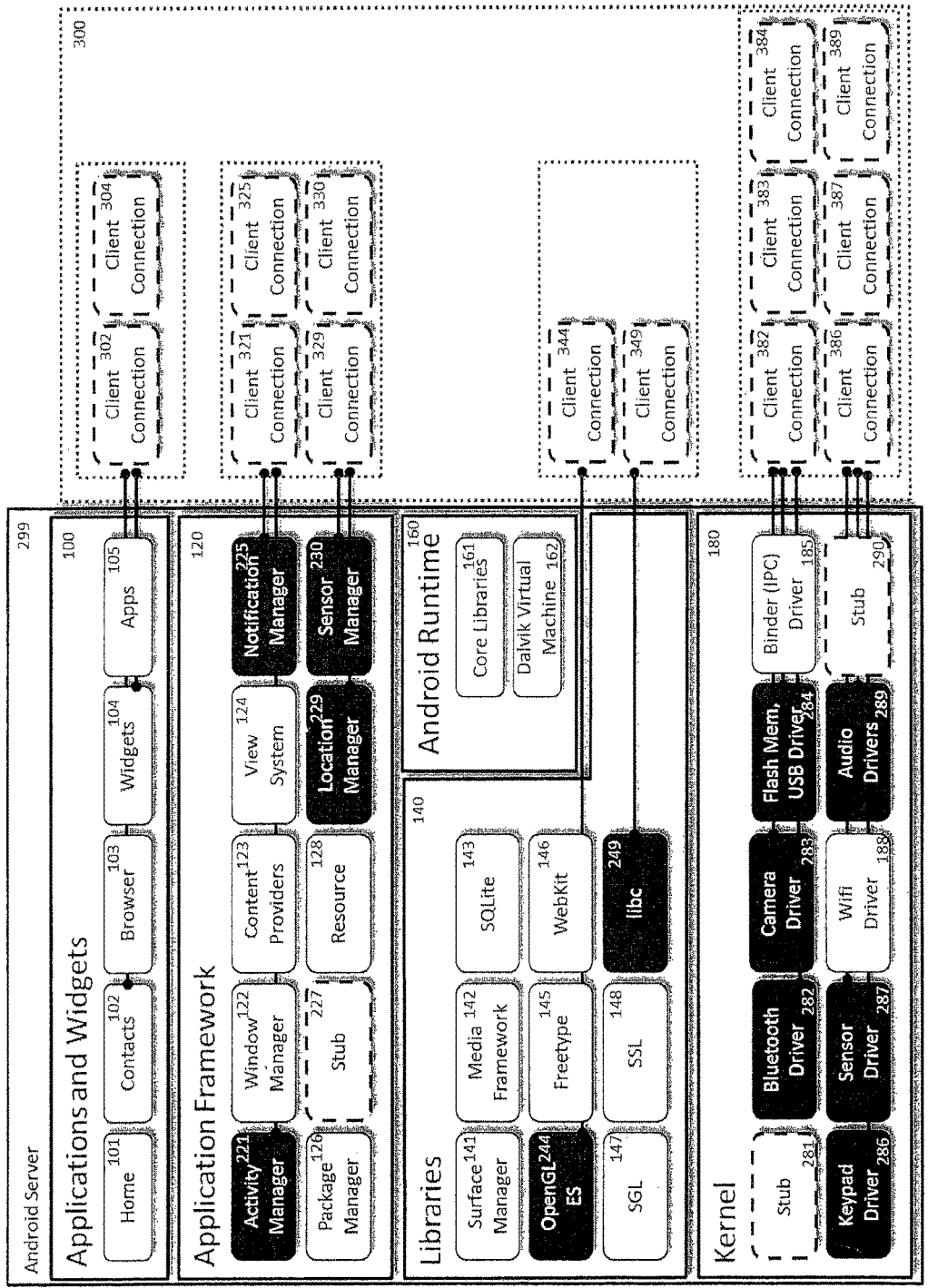
FIG. 2 illustrates the partitioning of the original Android System to enable distributed execution on a remote device according to one embodiment.
Figure 3:
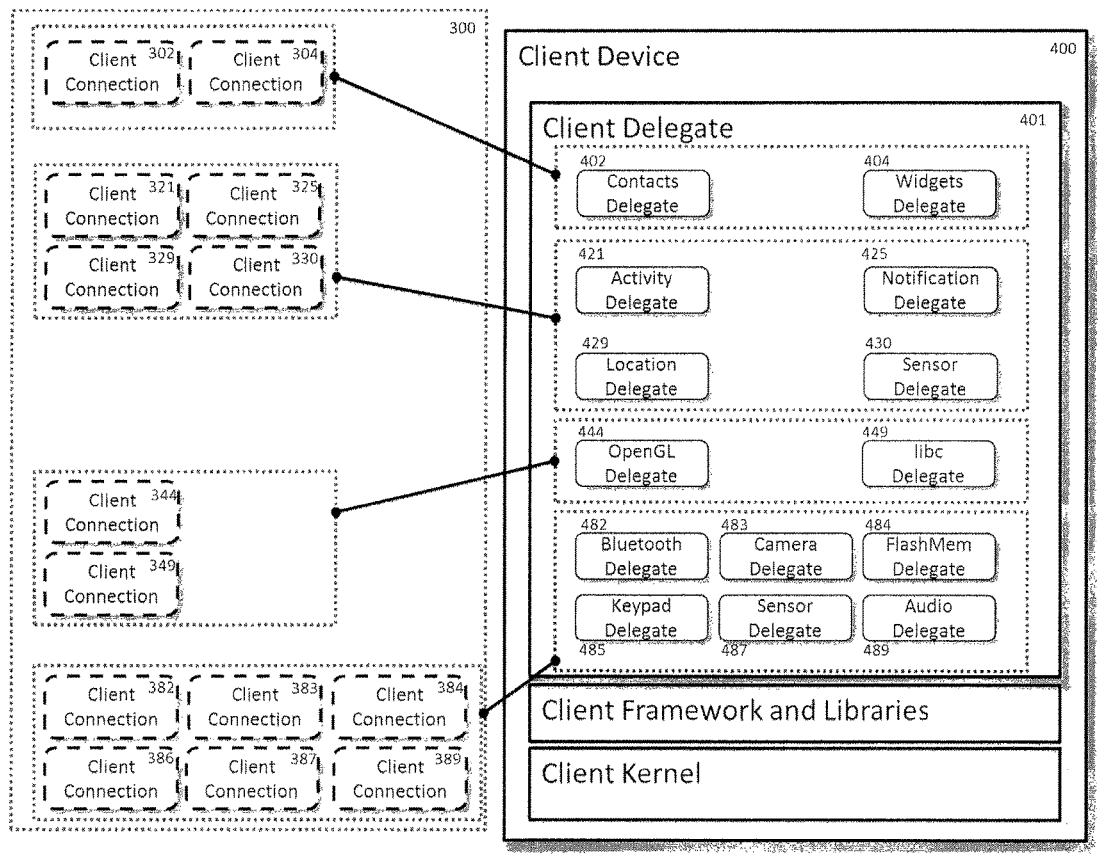
FIG. 3 illustrates the client delegate connected by a network connection to the corresponding partitioned Android Server according to one embodiment.

Partitioning the Original Android Device into a Client-Server Model with Client Delegation The Android system architecture is conventionally executed on a single device running the entire Android Stack. The proposed configuration describes the partitioning of the Android system as illustrated in FIG. 1 into a component executing on a server machine—Android Server 299—as illustrated in FIG. 2 and a component running on the client—Client Delegate 401—as illustrated in FIG. 3, connected to each other over the network 300. A key part of the proposed configuration is the selective delegation of functions of the Android operating system to the Client Delegate 401 so that these functions execute in the client context and environment. These functions are in addition to the traditional input and output functionality which executes on the client in a conventional remote display configuration, and this remote delegation of functionality is essential for the correct functioning of the App 105 executing on the Android Server 299. The delegation may take the form of either exchanging context information at initialization time or periodically to modify the default behavior of the calling function (static synchronization), or may take the form of forwarding the initial function in any format for executing an equivalent function on the Client Device 400 (runtime delegation).

The configuration described herein is not recognized by the traditional client-server model of execution such as remote display where the client handles the inputs and outputs while the Android Server 299 executes the application without any awareness of the client context and environment.

The requirements for the correct functioning of the App 105 on the Android Server 299 with display on the Client Device 400 are

Figure 4:
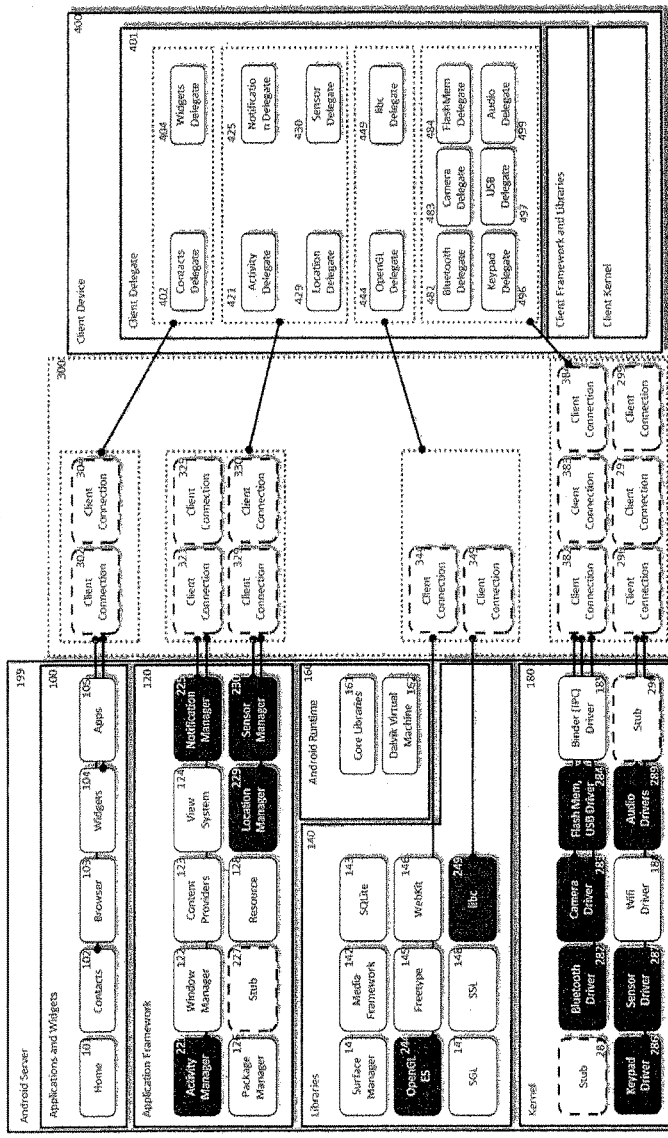
FIG. 4 illustrates the complete Android distributed system consisting of the partitioned Android Server connected by a network connection to the client delegate module on the Client Device according to one embodiment.

- The partitioned Android system as illustrated in FIG. 4 needs to be made aware of all the Client Device 400 capabilities because the behavior of the system is dependent on the supported capabilities
- All asynchronous user inputs are obtained from the Client Device 400 using the Client Delegate 401. This includes all input events generated by devices such as a keyboard, mouse, touch screen, sensor like gps, gyroscope, accelerometer, barometer, magnetometer etc.,
- All components of the Android Framework 120 which require client context to provide services to the running App 105 shall obtain the said client context from the Client Delegate 401.
- Some library functions require modification to use the client context instead of the server context. This may be achieved in multiple ways including
  - The Android Server 299 and Client Device 400 initially or periodically exchange context information. The Android Server 299 operating system components modify their default execution to selectively use the client context information.
  - If the relevant client context information cannot be detected or the calling function needs to be executed in the client context for other reasons, the calling function information and parameters are transmitted to the Client Delegate 401 which is responsible for calling an equivalent function on the Client Device 400 with the appropriately translated parameters. The return value of the Client Delegate 401 may be in the form of an immediate or blocking response, or a callback response which returns on completion of the Client Device 400 operation, or error responses as appropriate.
- Some kernel elements, primarily the hardware drivers, require modification so that they access the Client Device 400 hardware using the Client Delegate 401 as a conduit.

This description encompasses alternative embodiments which will be readily recognized as additional modifications without departing from the concepts described herein.

Framework/Services Needing Local Delegation

All components of the Android Framework 120 which require client context to provide services to the miming App 105 shall obtain client context from the Client Delegate 401. These include but are not limited to:

Activity Manager 221
Notification Manager 225
Location Manager 229
Sensor Manager 230
Input Manger
USB Manager
Alarm Manager
Sync Manager
Nfc Manager For each of these components, the configuration identifies the functionality which client context to execute.

Example of Notification Manager Delegation to Client

A specific example is the Android Notification Manager 125.

The Notification methods and objects as listed in Table 2 contain several properties providing information on the type of notification such as priority of the notification, type of notification (such as lights, sound, vibrate etc.,)

In one embodiment, the original Notification Manager 125 is transformed into a modified Notification Manager 225 on the Android Server 299 to transmit the notification functions along with required parameters to the Client Delegate 401 over the network 300. When the Client Delegate 401 receives the information over the network 300, the information is appropriately interpreted and client specific notification actions are performed. In the actual implementation, the transmission may be done by a transmission service between the Android Server 299 and the Client Device 400 or by other means. The responsibility of the transmission service is to serialize, transmit and receive information between any modified component on the Android Server 299 and the Client Delegate 401 in both directions.

Libraries Requiring Local Context

Some library functions require modification to use the client context instead of the server context. Some examples of these functions are system time, locale information, user device IP address, geographical coordinates etc.

The modifications made to the Android Libraries 240 to support client contexts may fall into the following alternative mechanisms, depending on the type of functions which need to be supported.

- At App 105 initialization or App 105 launch time, the server context is synchronized with the client context. Generally this is the preferred mechanism due to performance and network bandwidth utilization reasons.
- The library function is modified so that the runtime implementation of the function sends a message to the Client Delegate 401. The Client Delegate 401 interprets and executes this function on the local device and returns the response.

Example of Time Zone Context Synchronization with Client Device 400

The Android Server 299 may be running in a different time zone than the Client Device 400. The user running the App 109 remotely expects the App 109 to use the time zone of the Client Device 400.

Figure 7:
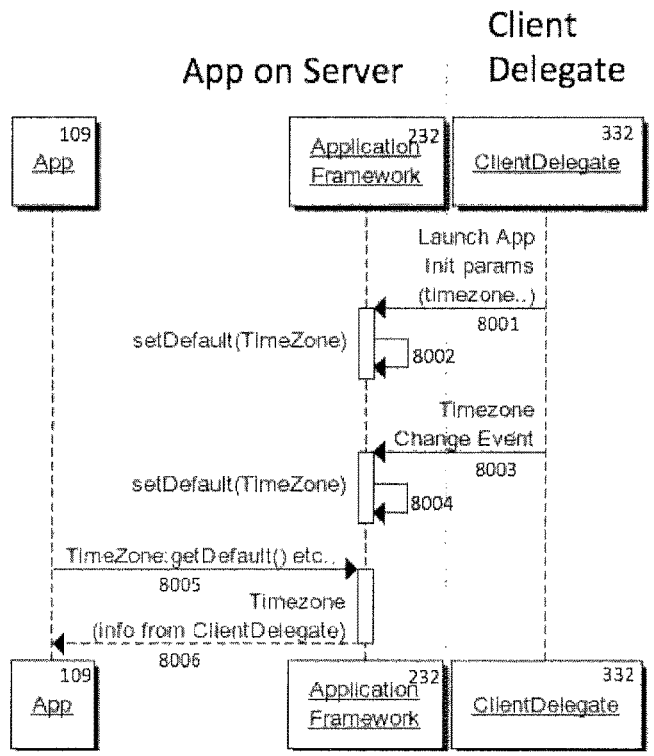
FIG. 7 illustrates the sequence diagram of synchronizing the time zone of the server to that of the client according to one embodiment.

The mechanism of achieving this time synchronization is illustrated in FIG. 7. In this embodiment, at initialization 8001 and during updates 8003 of Client Device 400 time zone state, there is an exchange of time zone information between the Client Device 400 and the Android Server 299, wherein the Client Delegate 401 communicates its time zone to the Android Server 299. This is used to force the default time zone of the Android Server 299 partition. The TimeZone class provided in the Android Libraries 240 has the following methods to enable setting the time zone of the App 109 on the Android Server 299.

synchronized static void setDefault(TimeZone timeZone);

Any future accesses of the time zone from the App 109 on the Android Server 299 results in the Client Device 400 time zone being made available to the App 109. This enables the correct behavior of the App 109.

This example serves as an illustration of the technique. Other embodiments may accomplish the same objective using the same concepts with different implementations.

App Initiated Accesses to Client Hardware Capabilities

Some apps request system services which can be correctly executed only in the client context. Examples are access to the hardware functions such as camera, Bluetooth® etc. One embodiment may implement this functionality by replacing or modifying the Android Server 299 kernel driver for the hardware function to delegate the request to the Client Delegate 401 over the network connection. The Client Delegate 401 appropriately fulfills this request on the Client Device 400 and returns the results to the Android Server 299 kernel driver.

Example Sequence of Camera Access Delegation to Client

In the case of an App 107 requesting a photograph, the Android Framework Camera Service 131 communicates with the Linux® Kernel Camera Driver 183 using the Camera Hardware Interface Library 151 as illustrated in FIG. 8. On the original Android device, the App 107 initiates a request to take a picture 6001 which is handled by the Camera App 108. The Camera App 108 calls the Framework Camera Service 131 to take a picture 6005, which interacts with the Camera Library 151 to take the picture 6006. The Camera Library 151 drives the hardware through the Camera Driver 183. On receiving the available image 6007 or 6009, the Camera Library 151 calls back the Framework Camera Service 131 which results in a raw 6008 or jpeg 6010 image being available to the Camera App 108, which then sends the picture back 6012 to the App 107.

Figure 9:
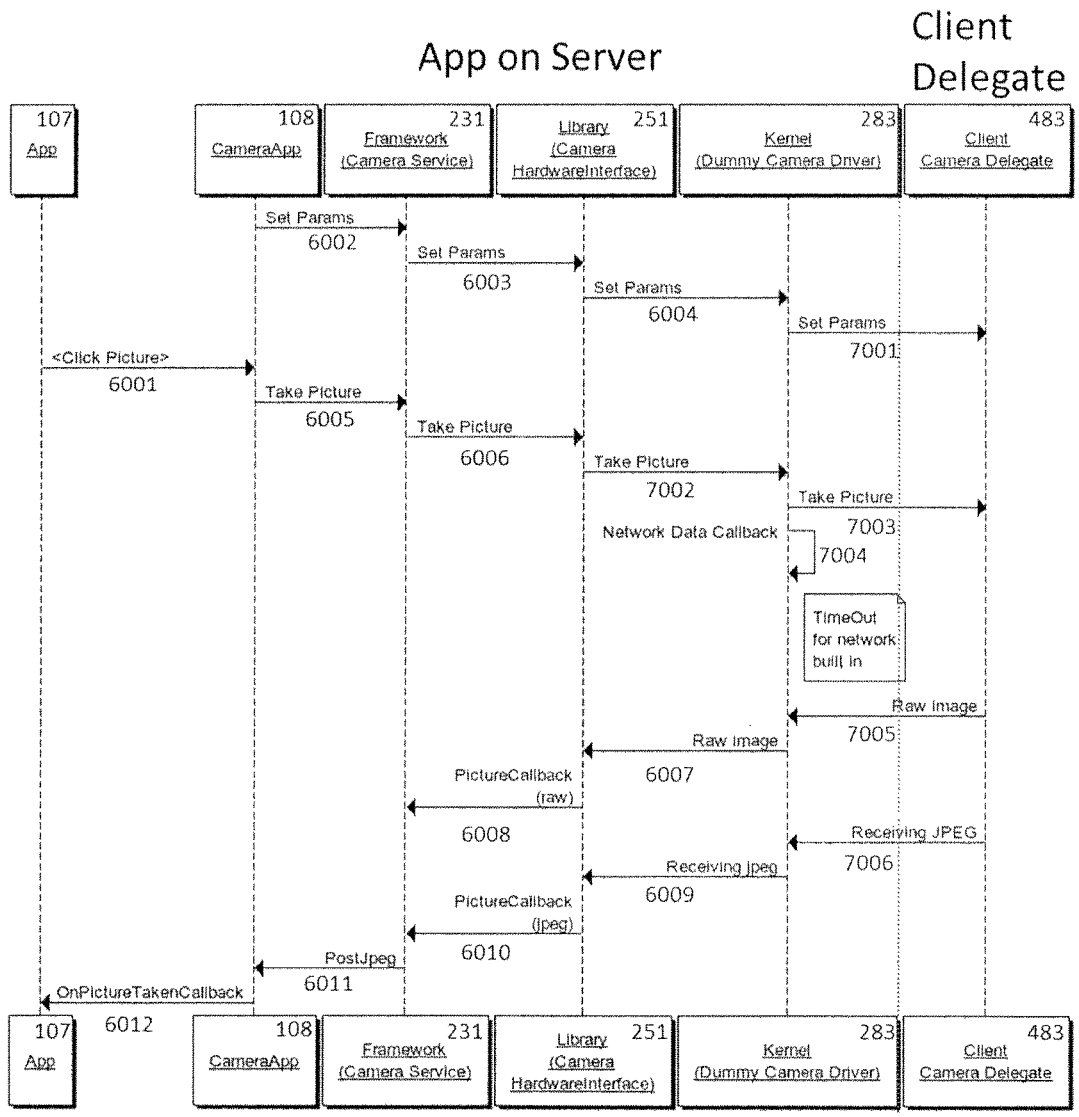
FIG. 9 illustrates a sequence diagram for the remote execution of the camera request on the Client Device according to one embodiment.

In this embodiment, the Camera Driver 283 is modified to forward the request 7003 to the Client Delegate 401 as illustrated in FIG. 9. The Client Delegate 401 appropriately fulfills the photo request and responds to the Android Server 299 with the appropriate response 7005 or 7006, including any error conditions. The Camera Driver 283 also polls or alternatively blocks on the network thread waiting for a response 7004 from the Client Delegate 401, and returns the image 7005 or 7006 to the Camera Hardware Interface Library 251. The modified driver also sets threshold for a network timeout or error responses from the Client Delegate 401 to account for additional error conditions which may occur.

Inputs/Outputs/Sensors

Figure 5:
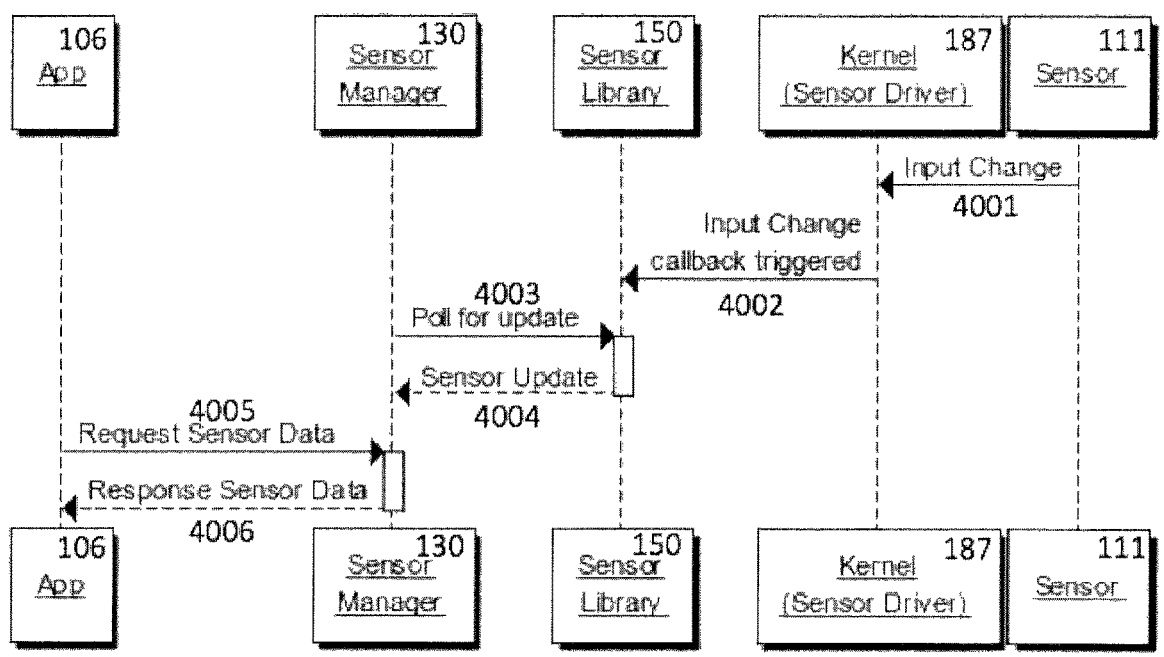
FIG. 5 illustrates the sequence diagram of an asynchronous operation (sensor input) of the original mobile device being processed by the device and made available to the app according to one embodiment.

All asynchronous user inputs are obtained from the Client Device 400 using the Client Delegate 401. This includes all input events generated by devices such as keyboard, mouse, touch inputs, sensor operations such as location, motion, direction etc. FIG. 5 illustrates the sequence diagram of input flow in the original device. The inputs update asynchronously and are made available to read 4001 by the Sensor Driver 187. The Sensor Driver 187 accesses the inputs and sends them to the Sensor Library 150 through a callback mechanism 4002. The Sensor Library 150 takes the inputs and puts them into a queue. The Android Sensor Manager 130 is responsible to poll the queue for any new events 4003 and on any new event change, it updates its own queue with the events 4004. At this point, the event is either sent back up to the applications or the application can poll for the new event 4005. On receiving the new event 4006, the application can then process the input as desired.

Figure 6:
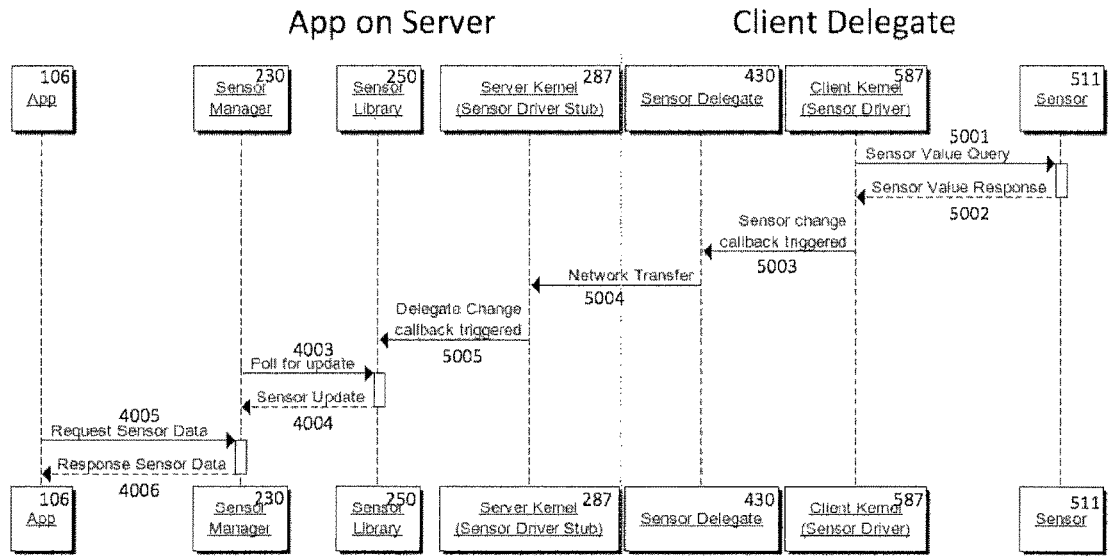
FIG. 6 illustrates the sequence diagram of the same example (sensor input) on the partitioned mobile system with delegation of the sensor manager functionality on the Client Device according to one embodiment.

FIG. 6 illustrates the sequence diagram for the client-server scheme. The Android Server Sensor Driver 287 is modified to read the inputs from the network 5004. The interaction of the Android Server Sensor Driver with the upper layers of the stack remains identical to the original device. In some situations, the reading of inputs may not be asynchronous and event driven by an input change, but may come from the upper layers of the Android stack. In those situations, the sequence diagram of the interaction is similar to that illustrated in FIG. 9.

Outputs are more straightforward and follow a conventional remote display mechanism. Outputs include screen image, audio and other auxiliary output signals such as vibrate signals. The display may be either transmitted by directly transmitting the OpenGL ES Library 244 calls intercepted in the Android Library 140 as is conventionally done in direct graphics transfer. Or alternatively the graphics may be locally rendered on the cloud and the resulting screen may be transmitted using conventional video streaming technology or remote window display technology. The audio is intercepted in the Linux Audio Driver 289 and encoded and streamed using conventional audio streaming technology.

BRIEF DESCRIPTION OF LISTINGS

Table 1 shows a partial listing of the Android APIs for functionality which may be suitable for full or partial delegation on the Client Device Table 2 shows the example of the notification manager APIs which may be delegated to the client for execution on the Client Device.

LISTINGS

TABLE 1

Android APIs: Full or partial delegation to Client
Android APIs candidates for full or partial delegation to Client Delegate Android.bluetooth
Android.nfc
Android.openGL
Android.hardware
   camera
   Android.hardware.display
   Android.hardware.input
   Android.hardware.usb
Android.location
   Gps
   Location
Android.Net
   ConnectinityManager
   NetworkInfo
   Android.net.wifi
   Android.Speech

TABLE 2

Notification manager methods for delegation to Client Device

| Notification Manager Public Method | Description |
|---|---|
| Void cancel(int id) | Cancel a previously shown notification |
| Void cancel(String tag, int id) | Cancel a previously shown notification |
| Void cancelAll( ) | Cancel all previously shown notifications |
| Void notify(int id, Notification notification) | Post a notification to be shown in the status bar |
| Void notify(string tag, int id, Notification notification) | Post a notification to be shown in the status bar |

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of executing a plurality of user software applications written for an Android operating system so that a plurality of user devices each operating with either an Android or a non-Android operating system can replicate the user software applications using inputs received from at least one of the plurality of user devices, the method comprising the steps of:

provided at a server system that includes a plurality of servers, processors and memory, the plurality of user software applications, and a server version of the Android operating system that includes an Android kernel driver capable of receiving client context inputs, wherein the client context inputs include real data inputs available from each of the plurality of user devices and simulated data inputs required for each of the plurality of user devices and further include a master data type set, the master data type set including a first type of master data comprising keyboard data, touch data, location data, motion data and a second type of master data comprising a plurality of software elements, wherein the plurality of software elements relate to data provided by the at least one of the plurality of user devices and include at least certain ones of the real data inputs or the simulated data inputs, and wherein at least one of the software elements determines what portion of a particular user software application is to be delegated for execution at the at least one of the plurality of user devices instead of being executed at the server system;

receiving, at the server system, a plurality of different requests to execute different ones of the plurality of user software applications, each different received request having a user device identifier associated therewith, such that each of the plurality of different user software applications is requested and which of the plurality of user devices made each different request is identified;

receiving, at the server system, an identifier associated with each of the plurality of user devices;

determining, at the server system, and based on the identifier, the client context inputs required for operation of each of the plurality of user software applications;

executing each of the plurality of user software applications either on the server system using the server version of the Android operating system based upon the plurality of different received requests, or at the at least one of the plurality of user devices, the step of executing including the steps of:

requesting using the server system, from each of the plurality of user devices, a plurality of client context inputs necessary to complete execution of each of the plurality of user software applications, wherein the client context inputs requested include various ones of the client context inputs required for operation of the plurality of user software applications and further include the first type of master data comprising the keyboard data, the touch data, the location data, and the motion data, some of which are real data and others of which are simulated data on the server system using the server version of the Android operating system;

receiving, at the server system and for processing by the Android kernel driver, the various client context inputs necessary to complete execution of the plurality of user software applications on the server system using the server version of the Android operating system;

generating, at the server system, output data that includes display data and audio data, rendered for perception at the user device with respect to each of the plurality of different user software applications, appropriate for perception of the user software applications at each of the plurality of user devices;

based on the at least one of the software elements in the second type of master data, generating a command to delegate a portion of the particular user software application for execution at the at least one of the plurality of user devices;

transmitting, from the server system, output data for reception by the user device for each of the plurality of different user software applications, such for the at least one of the plurality of user devices, output data received from the server system is configured to be combined with additional output data generated by the delegated portion of the particular user software application.

2. The method according to claim 1, wherein one of the plurality of software elements is a multi-touch input.

3. The method according to claim 1, wherein one of the plurality of software elements is a keyboard assignment to emulate an accelerometer.

4. The method according to claim 1, wherein one of the plurality of software elements is a keyboard assignment to emulate a gyroscope.

5. The method according to claim 1, wherein one of the plurality of software elements is a user input to emulate a compass.

6. The method according to claim 1, wherein one of the plurality of software elements is a lookup user device network connection type request.

7. The method according to claim 1, wherein one of the plurality of software elements is a lookup user device IP address request.

8. The method according to claim 1, wherein one of the plurality of software elements is a lookup user device system clock time request.

9. The method according to claim 1, wherein one of the plurality of software elements is a lookup user device location using a browser geolocation API request.

10. The method according to claim 1, wherein one of the plurality of software elements is a lookup user device and platform information request.

11. The method according to claim 1, wherein one of the plurality of software elements is one of a lookup 'contacts' information request, an activity manager information request, a notification manager information request, and a location manager information request on the user device.

12. The method according to claim 1, wherein one of the plurality of software elements is a browser widget delegate request to invoke a browser or browser popup on the user device.

13. The method according to claim 1, wherein the plurality of user devices includes at least one of a networked digital television, a networked personal computer, a networked browser, a networked mobile device, a networked game console and a networked set top box.

14. The method of claim 1, wherein a set of real data inputs further includes a digital picture obtained from one of the plurality of user devices; and
   wherein, for one of the plurality of the user applications, the step of executing the one of the plurality of user software includes requesting the digital picture as a part of the different input data.

15. The method according to claim 1, wherein the motion data is obtained from one of an accelerometer and a gyroscope disposed on one of the plurality of user devices.

16. The method according to claim 1, wherein the location data is obtained from one of a GPS, compass and IP address disposed on one of the plurality of user devices.

17. A non-transitory computer readable storage medium having stored thereon a computer program for executing a plurality of user software applications written for an Android operating system so that a plurality of user devices each operating with either an Android or a non-Android operating system can replicate the user software applications using inputs received from at least one of the plurality of user devices, the computer program comprising a program code which when provided at a server system that includes a plurality of servers, processors and memory, the plurality of user software applications, and a server version of the Android operating system that includes an Android kernel driver capable of receiving client context inputs, wherein the client context inputs include real data inputs available from each of the plurality of user devices and simulated data inputs required for each of the plurality of user devices and further include a master data type set, the master data type set including a first type of master data comprising keyboard data, touch data, location data, motion data and a second type of master data comprising a plurality of software elements, wherein the plurality of software elements relate to data provided by the at least one of the plurality of user devices and include at least certain ones of the real data inputs or the simulated data inputs, and wherein at least one of the software elements determines what portion of a particular user software application is to be delegated for execution at the at least one of the plurality of user devices instead of being executed at the server system;

receiving, at the server system, a plurality of different requests to execute different ones of the plurality of user software applications, each different received request having a user device identifier associated therewith, such that each of the plurality of different user software applications is requested and which of the plurality of user devices made each different request is identified;

receiving, at the server system, an identifier associated with each of the plurality of user devices;

determining, at the server system, and based on the identifier, the client context inputs required for operation of each of the plurality of user software applications;

executing each of the plurality of user software applications either on the server system using the server version of the Android operating system based upon the plurality of different received requests, or at the at least one of the plurality of user devices, the step of executing including the steps of:

requesting using the server system, from each of the plurality of user devices, a plurality of client context inputs necessary to complete execution of each of the plurality of user software applications, wherein the client context inputs requested include various ones of the client context inputs required for operation of the plurality of user software applications and further include the first type of master data comprising the keyboard data, the touch data, the location data, and the motion data, some of which are real data and others of which are simulated data on the server system using the server version of the Android operating system;

receiving, at the server system and for processing by the Android kernel driver, the various client context inputs necessary to complete execution of the plurality of user software applications on the server system using the server version of the Android operating system;

generating, at the server system, output data that includes display data and audio data, rendered for perception at the user device with respect to each of the plurality of different user software applications, appropriate for perception of the user software applications at each of the plurality of user devices;

based on the at least one of the software elements in the second type of master data, generating a command to delegate a portion of the particular user software application for execution at the at least one of the plurality of user devices;

transmitting, from the server system, output data for reception by the user device for each of the plurality of different user software applications, such that for the at least one of the plurality of user devices, output data received from the server system is configured to be combined with additional output data generated by the delegated portion of the particular user software application.

18. The non-transitory computer readable storage medium according to claim 17, wherein one of the plurality of software elements is a multi-touch input.

19. The non-transitory computer readable storage medium according to claim 17, wherein the plurality of user devices includes at least one of a networked digital television, a networked personal computer, a networked browser, a networked mobile device, a networked game console and a networked set top box.

20. The non-transitory computer readable storage medium according to claim 17, wherein the motion data is obtained from one of an accelerometer and a gyroscope disposed on one of the plurality of user devices.

21. The non-transitory computer readable storage medium according to claim 17, wherein the location data is obtained from one of a GPS, compass and IP address disposed on one of the plurality of user devices.

22. An apparatus for executing a plurality of user software applications written for an Android operating system so that a plurality of user devices each operating with either an Android or a non-Android operating system can replicate one or more user software applications using inputs received from at least one of the plurality of user devices, the apparatus comprising:

a server system that includes a plurality of servers, processors and memory; and a computer program comprising a program code stored within the memory, which, when executed by the server system, performs the steps of:

controlling the plurality of user software applications, and a server version of the Android operating system that includes an Android kernel driver capable of receiving client context inputs, wherein the client context inputs include real data inputs available from each of the plurality of user devices and simulated data inputs required for each of the plurality of user devices and further include a master data type set, the master data type set including a first type of master data comprising keyboard data, touch data, location data, motion data and a second type of master data comprising a plurality of software elements, wherein the plurality of software elements relate to data provided by the at least one of the plurality of user devices and include at least certain ones of the real data inputs or the simulated data inputs, and wherein at least one of the software elements determines what portion of a particular user software application is to be delegated for execution at the at least one of the plurality of user devices instead of being executed at the server system;

receiving, at the server system, a plurality of different requests to execute different ones of the plurality of user software applications, each different received request having a user device identifier associated therewith, such that each of the plurality of different user software applications is requested and which of the plurality of user devices made each different request is identified;

receiving, at the server system, an identifier associated with each of the plurality of user devices;

determining, at the server system, and based on the identifier, the client context inputs required for operation of each of the plurality of user software applications;

executing each of the plurality of user software applications either on the server system using the server version of the Android operating system based upon the plurality of different received requests, or at the at least one of the plurality of user devices, the step of executing including the steps of:

requesting using the server system, from each of the plurality of user devices, a plurality of client context inputs necessary to complete execution of each of the plurality of user software applications, wherein the client context inputs requested include various ones of the client context inputs required for operation of the plurality of user software applications and further include the first type of master data comprising the keyboard data, the touch data, the location data, and the motion data, some of which are real data and others of which are simulated data on the server system using the server version of the Android operating system;

receiving, at the server system and for processing by the Android kernel driver, the various client context inputs necessary to complete execution of the plurality of user software applications on the server system using the server version of the Android operating system;

generating, at the server system, output data that includes display data and audio data, rendered for perception at the user device with respect to each of the plurality of different user software applications, appropriate for perception of the user software applications at each of the plurality of user devices;

based on the at least one of the software elements in the second type of master data, generating a command to delegate a portion of the particular user software application for execution at the at least one of the plurality of user devices;

transmitting, from the server system, output data for reception by the user device for each of the plurality of different user software applications, such that for the at least one of the plurality of user devices, output data received from the server system is configured to be combined with additional output data generated by the delegated portion of the particular user software application.

23. The apparatus according to claim 22, wherein one of the plurality of software elements is a multi-touch input.

24. The apparatus according to claim 22, wherein the plurality of user devices includes at least one of a networked digital television, a networked personal computer, a networked browser, a networked mobile device, a networked game console and a networked set top box.

25. The apparatus according to claim 22, wherein the motion data is obtained from one of an accelerometer and a gyroscope disposed on one of the plurality of user devices.

26. The apparatus according to claim 22, wherein the location data is obtained from one of a GPS, compass and IP address disposed on one of the plurality of user devices.

* * * * *